INVENTORS.
William F. Handford
& Fred Riggs
BY Victor J. Evans & Co.
ATTORNEYS

United States Patent Office 2,837,947
Patented June 10, 1958

2,837,947

WALL MOUNTED JAR TOP REMOVER WITH ADJUSTABLE DIAMETER SPLIT BAND

William F. Handford and Fred Riggs, Cave City, Ark.

Application June 13, 1956, Serial No. 591,075

2 Claims. (Cl. 81—3.3)

This invention relates to devices used by the housewife, particularly in canning or in opening cans, and in particular a clamp adapted to be secured on the cover of a fruit jar to facilitate tightening and loosening the cover.

The purpose of this invention is to provide postive gripping means with sufficient leverage to facilitate unscrewing the cap or cover of a fruit jar without injury to the hand of the housewife.

Various devices have been provided for gripping the cover of a fruit jar in order to break the seal and start the turning of the cover or cap on the jar, however, it is difficult to grip the cover with sufficient force to start the turning movement and mechanical devices for this use are too costly and complicated to permit universal use. With this thought in mind this invention contemplates a band having a screw extended through flanges at the ends with one of the flanges extended into a handle and with a right angularly positioned tongue on the end of the handle adapted to be positioned in a bracket for supporting the clamp with a glass jar therein so that both hands may be used for turning the jar.

The object of this invention is, therefore, to provide a clamp for gripping the cover of a fruit jar to facilitate turning the cover in which the handle extended from the clamp provides sufficient leverage for tightening and loosening the cover.

Another object of the invention is to provide a holder for turning covers of fruit jars in which the holder is adapted to be removably supported in a wall bracket so that the jar may be gripped with both hands of the operator.

A further object of the invention is to provide a fruit jar cover holding clamp to facilitate turning the cover in which the device is of a simple and economical construction.

With these and other objects and advantages in view the invention embodies a split rubber lined band having flanges extended from ends thereof with one flange extended from a handle having a tongue for supporting the device in a wall bracket extended from the opposite end, and a screw having a toggle acting handle pivotally mounted on the head extended through the flanges of the band for clamping the band on a fruit jar cover.

Other features and advantages of the invention will appear from the following description taken in connection with the drawing, wherein.

Figures 1, 2, 3, 4:
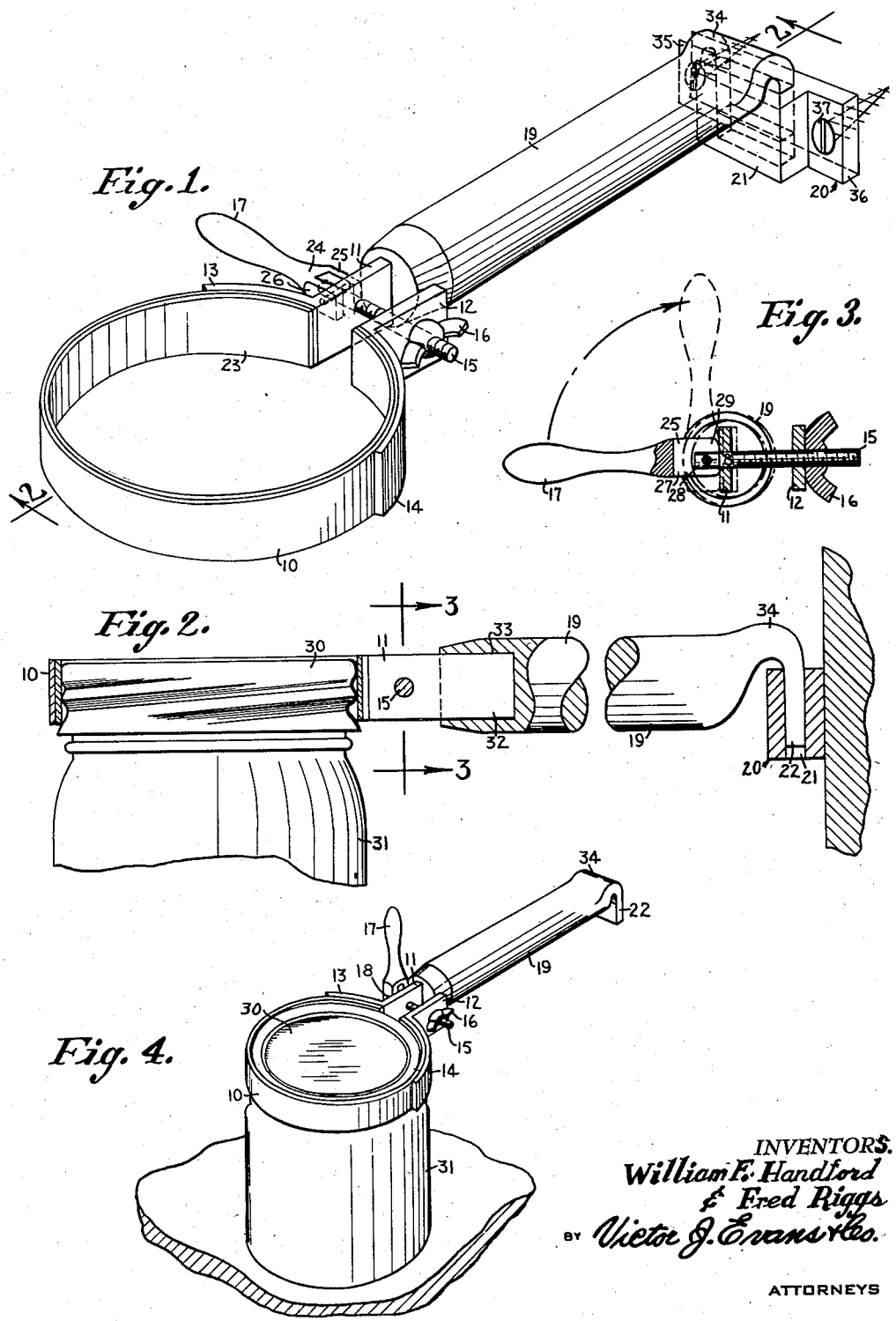
Figure 1 is a perspective view illustrating the improved fruit jar cover holder.
Figure 2 is a longitudinal section through the holder taken on line 2—2 of Fig. 1 with parts broken away.
Figure 3 is a cross section through the flanges of the clamp of the holder, said section being taken on line 3—3 of Fig. 2 and showing the handle of the clamping elements in the free position in full lines and in the clamping position in broken lines.
Figure 4 is a view showing the holder positioned over a cover of a fruit jar.

Referring now to the drawing wherein like reference characters denote coresponding parts the improved fruit jar cover holder of this invention includes a band 10 having flanges 11 and 12 secured to outer surfaces of ends thereof with arcuate base sections 13 and 14, a screw 15 extended through the flanges with a wing nut 16 on one end and a handle 17 pivotally mounted by a pin 18 on the opposite end, a hand gripping handle 19 from which the flange 11 extends, and a wall bracket 20 having a socket 21 in which a tongue 22 on the end of the handle 19 is adapted to be positioned, for supporting the holder in an extended horizontally disposed position.

The band 10 is provided with a lining 23 of rubber or other resilient or friction gripping material and the base members 13 and 14 of the flanges 11 and 12 are secured to the outer surface of the band 10 by welding or by other suitable means.

As illustrated in Figs. 1 and 3 the handle or lever 17 is provided with a bifurcated end 24 having flanges 25 and 26 through which the pin 18 extends and providing a slot 27 in which the head 28 of the screw 15 is positioned. As illustrated in Fig. 3 the pin 18 is eccentrically positioned in the flanges 25 and 26 providing a raised portion 29 which, upon moving the lever 17 from the full line position to that shown in broken lines, forces the flange 11 inwardly or toward the flange 12 whereby the area of the band 10 is decreased and the inner surface thereof grips a cover 30 of a fruit jar 31.

An extended end 32 of the flange 11 is secured in a socket 33 in the end of the handle 19, as shown in Fig. 2, the end 32 being retained in the socket by being molded therein or by other suitable means. The oposite end of the handle 19 is provided with an offset section 34 from which the tongue 22 extends, and when it is desired to use both hands on the can or fruit jar the tongue is placed in the socket 21 of the bracket 20 whereby the device is positively held and both hands may be used for turning the jar.

The bracket 20 is provided with flanges 35 and 36 through which screws 37 may be placed for mounting the bracket on a wall surface or the like. The bracket is also provided with an outwardly extended intermediate portion in which the socket 21 is positioned.

With the parts assembled as illustrated and described a device is provided for turning caps or covers of fruit jars and the like and, as illustrated in Fig. 4 the band 10 is placed over a cover 30 of a fruit jar whereby with the fruit jar held in one hand and the handle 19 gripped by the other the cover 30 may be tightened on the jar or loosened when it is desired to remove the cover from the jar.

Should more force be required for turning the cover of the jar the tongue 22 is inserted in the socket 21 of the bracket 20 so that both hands may be applied to the jar to turn the jar to tighten or loosen the cover.

It will be understood that modifications, within the scope of the appended claims, may be made in the design and arrangement of the parts without departing from the spirit of the invention.

What is claimed is:

1. In a jar top holder, the combination which comprises a split band having flanges extended from the ends thereof with a screw extended through the flanges, a lining of resilient material positioned on the inner surface of the band, a wing nut threaded on the screw extended through the flanges thereof, a lever pivotally mounted on the head of the screw, the pivotal mounting being eccentrically positioned in the lever whereby upon actuating the lever to an angle of 90 degrees the band is contracted on a jar top, a handle extended from one of said flanges and having a tongue extended from the end opposite to that from which the flange extends, and a wall bracket having a vertically disposed socket therein in which the socket is positioned to receive the tongue of the handle.

2. In a jar top holder, the combination which comprises a split band having flanges extended from the ends thereof with a screw extended through the flanges, a lining of resilient material positioned on the inner surface of the band, a wing nut threaded on the screw extended through the flanges thereof, a lever pivotally mounted on the head of the screw, the pivotal mounting being eccentrically positioned in the lever whereby upon actuating the lever to an angle of 90 degrees the band is contracted on a jar top, a handle extended from one of said flanges and having a tongue extended from the end opposite to that from which the flange extends, said tongue being positioned at a right angle in relation to the handle and being extended from an offset section of the handle, and a wall bracket having a vertically disposed socket therein in which the socket is positioned to receive the tongue of the handle.

References Cited in the file of this patent
UNITED STATES PATENTS

| | | |
|---|---|---|
| 1,359,815 | Lawson | Nov. 23, 1920 |
| 1,858,144 | Fariello | May 10, 1932 |
| 1,992,322 | Nulf et al. | Feb. 26, 1935 |
| 2,354,935 | Andrea | Aug. 1, 1944 |